United States Patent [19]
Moon

[11] Patent Number: 6,010,319
[45] Date of Patent: Jan. 4, 2000

[54] CANNED MOTOR PUMP

[75] Inventor: Seong-Dae Moon, Kyeongbook, Rep. of Korea

[73] Assignee: Daewoo Electronics Co., Ltd., Seoul, Rep. of Korea

[21] Appl. No.: 08/960,339

[22] Filed: Oct. 29, 1997

[30] Foreign Application Priority Data

Nov. 29, 1996 [KR] Rep. of Korea ...................... 96-59554

[51] Int. Cl.⁷ .................................................. F04B 17/00
[52] U.S. Cl. .............................. 417/423.14; 417/423.7; 417/430; 417/366
[58] Field of Search ...................... 417/430, 423.7, 417/423.14, 366, 368

[56] References Cited

U.S. PATENT DOCUMENTS

| | | | |
|---|---|---|---|
| 2,245,989 | 6/1941 | Leathers | 417/368 |
| 3,102,679 | 9/1963 | Rudy | 417/423.14 |
| 3,545,890 | 12/1970 | Hubbard et al. | 417/423.14 |
| 4,465,437 | 8/1984 | Jensen et al. | |
| 5,489,191 | 2/1996 | Tai | 417/423.14 |

FOREIGN PATENT DOCUMENTS

| | | |
|---|---|---|
| 1106478 | 3/1968 | United Kingdom. |
| 2150979A | 7/1985 | United Kingdom. |

*Primary Examiner*—Timothy S. Thorpe
*Assistant Examiner*—Cheryl J. Tyler
*Attorney, Agent, or Firm*—Smith, Gambrell & Russell, LLP

[57] ABSTRACT

A canned motor pump has a rotor 130 rotatably provided in the first tube cup 270. The rotor 130 further includes the second tube cup 190 and the cap 170, and the raindrop-shaped protrusion is provided on each bottom surface of the second tube cup and exterior surface of the cap. The motor end cover 110 having a louvered lip, further, is provided between the pump 30 and the motor 100.

5 Claims, 6 Drawing Sheets

CANNED MOTOR PUMP

BACKGROUND OF THE INVENTION

1. Field of the Invention

The present invention relates to a canned motor pump, more particularly to a canned motor pump having a protrusion shaped as a raindrop at each side of a rotor, in which a narrow width of the protrusion is directed toward a rotation shaft.

2. Description of the Prior Art

FIG. 7 shows a conventional canned pump motor. The canned pump motor is comprised of a motor 10, and a pump 30 assembled with the motor 10, between which a motor end cover 11 is interposed. In a rotor 13 of the motor 10, each end of the core assembly 15 is covered with respective caps 17L,17R. A pipe type can 19 is fitted on the circumference of the core assembly 15, and both open ends 21 of the can 19 are curled.

When the impeller 31 of the pump 30 starts by power of the motor 10, intake pressure below atmospheric pressure occurs at a central inlet 33 of the impeller 31. Thus, the inside of a rotor chamber 13C is below atmospheric pressure owing to the passage 39 formed around the bush 37 adjacent to a rotational shaft 35 and the cap 17L. Therefore, a difference in pressure occurs between the inside fluid of the rotor chamber and the fluid in the housing of the pump 30 exchanged from the outlet 31T of the impeller. The pressurized fluid of the pump housing is discharged through the normal discharge route of the pump housing, and simultaneously the pressurized fluid inflows to the rotor chamber 13C through the passage communicated with the inside of the rotor chamber 13C, i.e., through the gap between the rotational shaft 35 and the bush 37 and the special passage 12 provided at the motor end cover 11. The temperature of the intake fluid due to the pressure difference is relatively lower than that of the motor coil, and heat of the rotor 13 and stator 23 is reduced.

To establish the cool flow route, a gap 43 about 0.3 mm to 0.4 mm is formed between the rotor 13 and the stator 23 as shown in FIG. 7. Efficiency of the motor depends on the size of the gap; in relation with the gap X and the motor torque T the equation is $T=1/X^2$, in which the smaller gap contributes to the motor having good efficiency. Therefore, to increase the efficiency of the motor the gap 43 between the rotor and the stator must be reduced. The canned motor pump having the above configuration is disclosed in U.S. Pat. No. 4,465,437.

In a conventional canned motor pump, when the fluid of the pump chamber having foreign material inflows to the rotor chamber through the passage communicated with the rotor chamber, there is a problem that the foreign material clogs the fluid passage. On the other hand, the foreign material of the fluid in the rotor chamber inflows to the gap, and the rotor or the stator can wear out, thereby causing a problem of shortening the life of the pump. The metallic foreign material within metal rusty water inflows to the gap, and the metallic foreign material accumulates on the ferrous rotor and stator, thus resulting in the typical problem that the rotor and the stator become stuck.

Furthermore, in the can assembled on the circumference of the rotor, since both open ends of each can are curled on the side surface of the rotor, fluid can easily permeate the rotor assembly. Particularly, the foreign material contained in the fluid is liable to be caught at the curling portion of the rotor assembly directed to the impeller, which causes another problem.

SUMMARY OF THE INVENTION

Therefore, it is an object of the present invention to provide a canned motor pump for solving the problems.

It is another object of the present invention to provide a canned motor pump for preventing the inflow of the foreign material into the rotor chamber.

It is a further object of the present invention to provide a canned motor pump for preventing the access of the foreign material into the gap between the rotor and the stator.

It is a final object of the present invention to provide a canned motor pump for the fluid to be impervious to the rotor.

In order to achieve the above objects of the present invention, a canned motor pump is comprised of a centrifugal pump, and a motor separated from the pump by a motor end cover. The motor comprises a rotor rotatably housed in a first tube cup, and a stator encompassing the first tube cup. The rotor comprises an open-ended second tube cup housing wire assembly, and a sealable cap blocking the open end of the second tube cup. A plurality of protrusions are provided on bottom surface of the second tube cup and exterior surface of the sealable cap, radially extending toward a rotational shaft of the rotor. The protrusion is configured as a raindrop as seen perpendicularly to a cross-section of the rotational shaft.

Further, a narrow end of the protrusion is directed toward the rotation shaft.

Furthermore, the narrow end of the protrusion is lower in height than that of the other wide end of the protrusion.

Moreover, the partition has a plurality of louvered lips, each free end of the louvered lip extends outward from the rotational shaft.

Further, the free end of the louvered lip is extended toward the impeller of the pump member.

BRIEF DESCRIPTION OF THE DRAWINGS

The above objects and other advantages of the present invention will be more clarified by describing a preferred embodiment thereof with reference to the accompanying drawings in which.

DESCRIPTION OF THE PREFERRED EMBODIMENT

Hereafter, components which are the same as that of the prior art are designated by the same numerals. Thus, no detailed explanation of those components will be provided.

Figure 1:
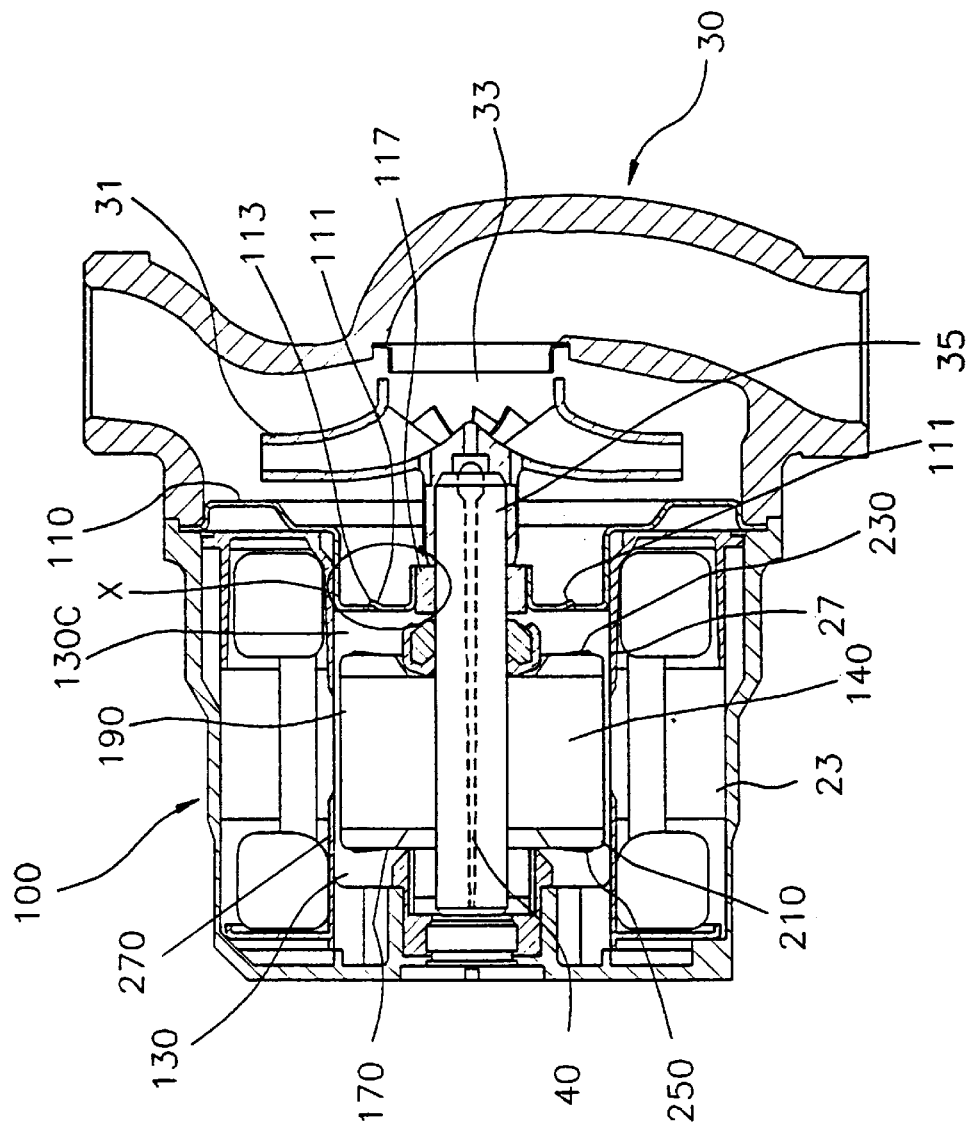
FIG. 1 is a longitudinal cross-sectional view of a canned motor pump according to the present invention.
Figure 2:
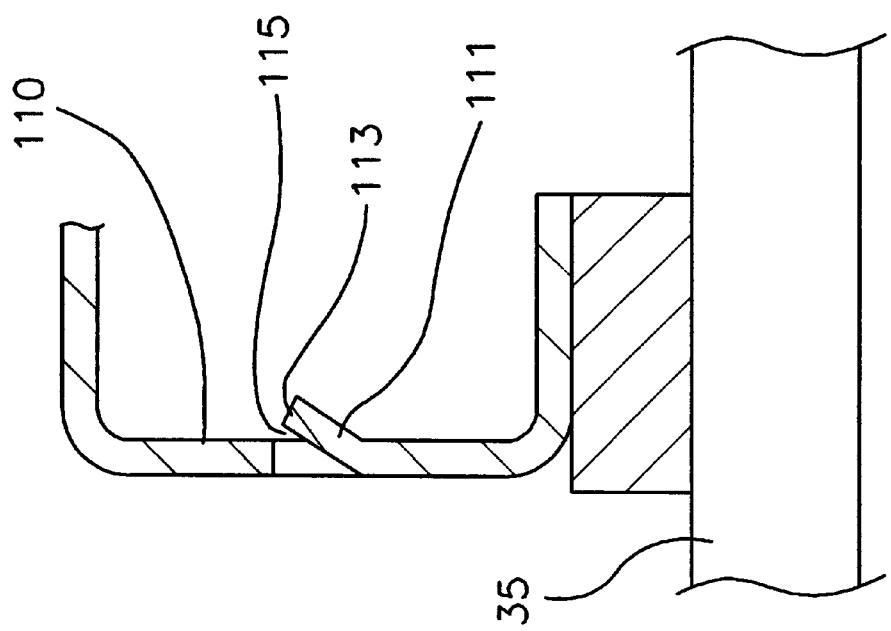
FIG. 2 is an enlarged cross-sectional view of X area of FIG. 1.

A canned motor pump of the present invention is comprised of a pump 30, and a rotor 100 assembled with the pump 30 separated by a motor end cover 110. The motor end cover 110 provides an opening 117 at a center of the motor end cover 110 for bushingly supporting the rotational shaft 35. A plurality of louvered lips 111 further are provided at a circumference of an opening 115. Each free end 113 of the louvered lips 111 is extended outward from the rotational shaft 35 (FIG. 2). Furthermore, the free end 113 of the louvered lip 111 is extended toward the impeller 31 of the pump.

Figure 3:
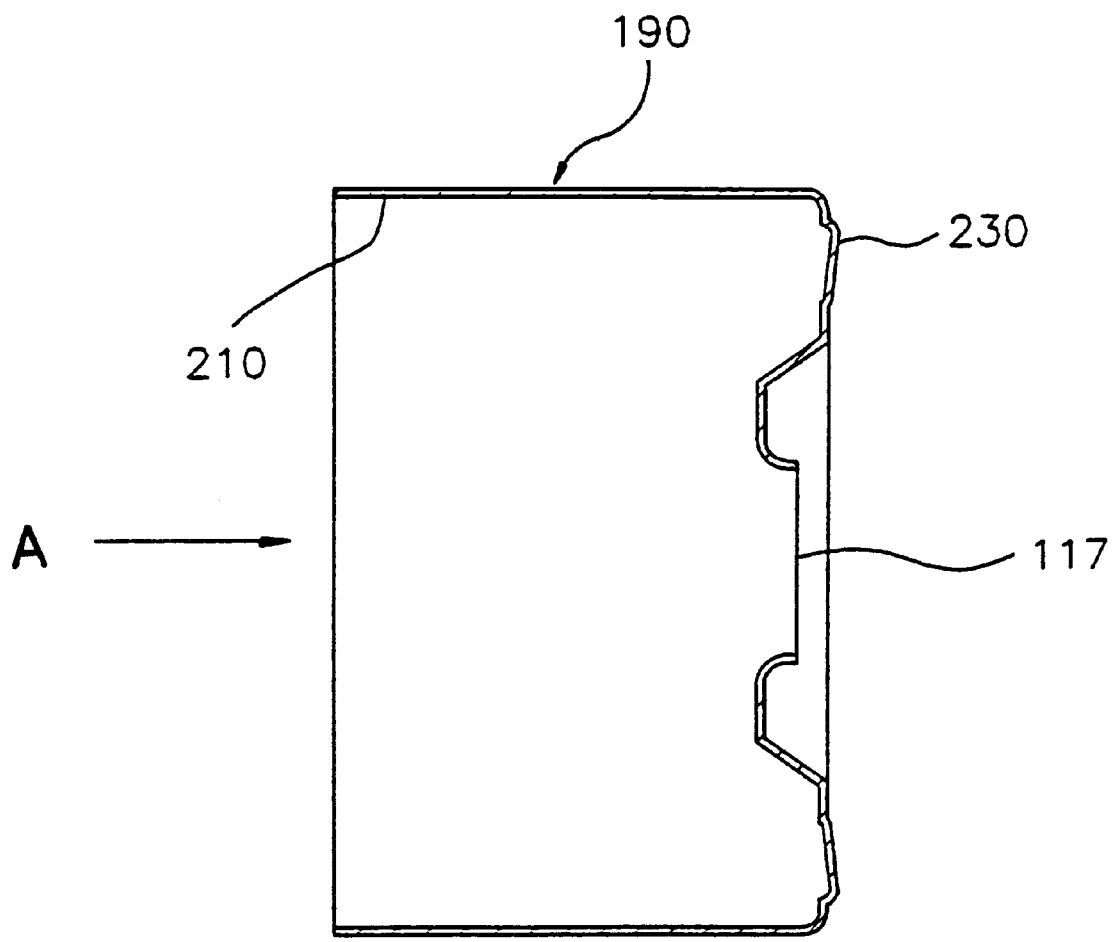
FIG. 3 is a longitudinal cross-sectional view of a second tube cup of FIG. 1.
Figure 4:
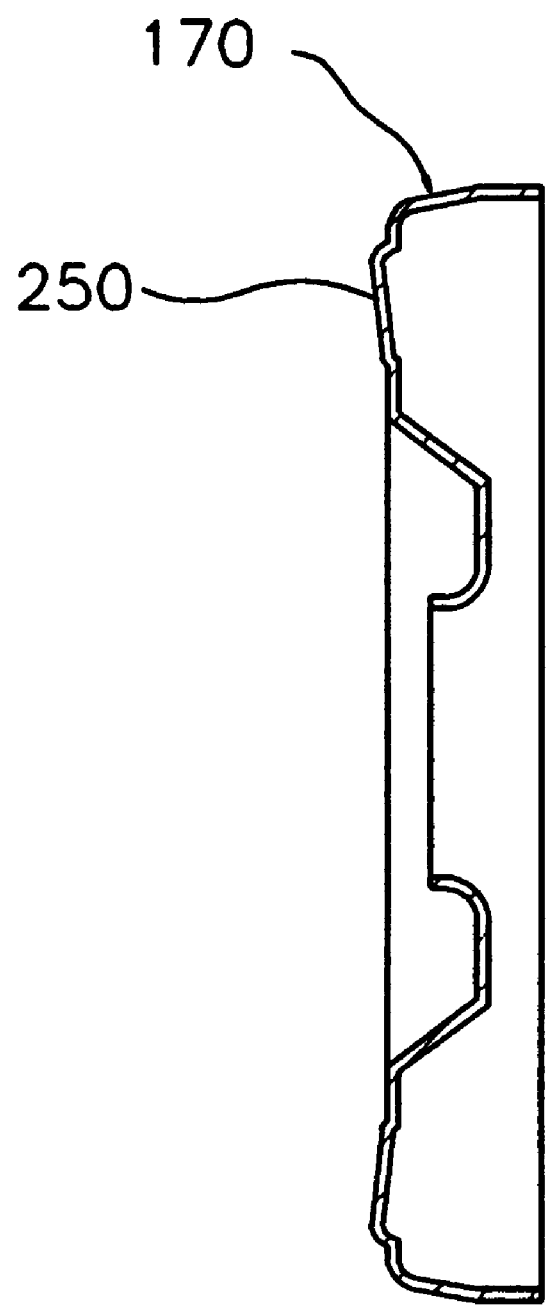
FIG. 4 is a longitudinal cross-sectional view of a cap of FIG. 1.
Figure 5:
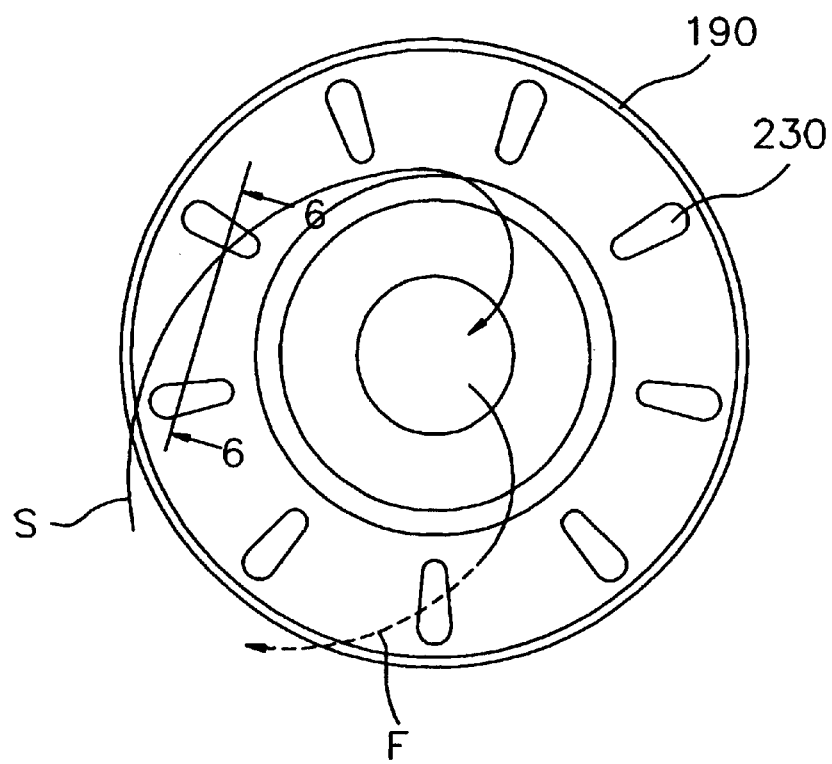
FIG. 5 is a front view taken along arrow A of FIG. 3.

The motor 100 is comprised of a rotor 130 rotatingly provided at a first tube cup 270, and a stator 23 encompassing the first tube cup 270. The rotor 130 is comprised of wires (not shown) being wound on cores 140 stacked on the rotational shaft 35, and a second tube cup 190 being blanketed on the wire assembly. The second tube cup 190, as shown in FIG. 3, has one open end. A plurality of protrusions 230, furthermore, are provided at a bottom surface of the second tube cup 190 as shown in FIG. 5. At one end of the wire assembly a cap 170 configurated as FIG. 4 is assembled. A plurality of protrusions 250 are provided at an exterior surface of the cap 170 like a shape of the second tube cup 190.

The protrusion 230 is configurated as a raindrop as shown in FIG. 5, and a protrusion 250 is similarly configured. The narrow width portion of the protrusion 230 is directed toward the rotational shaft 35, whereas the wide width portion of the protrusion 230 is extended away from the rotational shaft 35. Further, a height of the narrow width portion is lower than that of the wide width portion. That is, an upper surface of the protrusion downslopes toward the rotational shaft.

One open ended portion 210 of the second tube cup 190 is curled on the circumferential surface of the cap 170 which is fitted on one end of the wire assembly. Therefore, fluid is impervious to the core 140 of the rotor 130.

The canned motor pump according to the present invention constructed as above is operated as below.

The impeller 31 of the pump 30 starts by power of the motor 100. Intake pressure below atmospheric pressure occurs at a central inlet 33 of the impeller 31. Thus, air inside the rotor chamber 130C can be discharged to the central inlet 33 through the passage 40 provided in the rotational shaft 35. Fluid in the pump 30 is intaken to the rotor chamber 130C through the openings 115 of the motor end cover 110 which are formed by louvered stamping. Since the opening 115 is configured with a very narrow slit, foreign material contained in the fluid can not pass through the opening 115. Fluid inflowed into the rotor chamber 130C is converted to a vortex flow owing to the rotation of the rotor 130. Under the influence of the centrifugal force of the flow, a first fluid flows in the direction of the circumference of the rotor 130 as shown by dotted arrow F of FIG. 5. Thereafter, a momentum radius of the first fluid flow is confined by the first tube cup 270. At this time, a second fluid flow occurs owing to the remaining energy of the fluid. The second fluid flow is illustrated by the direction of a solid line arrow S of FIG. 5. The direction of the second fluid flow under the influence of the momentum radius is directed toward the rotational shaft 35 of the rotor 130. Linear velocity of the fluid is slower at an area adjacent to the rotational shaft 35, and relatively heavy foreign material gathers at an area adjacent to the rotational shaft 35.

Figure 6:
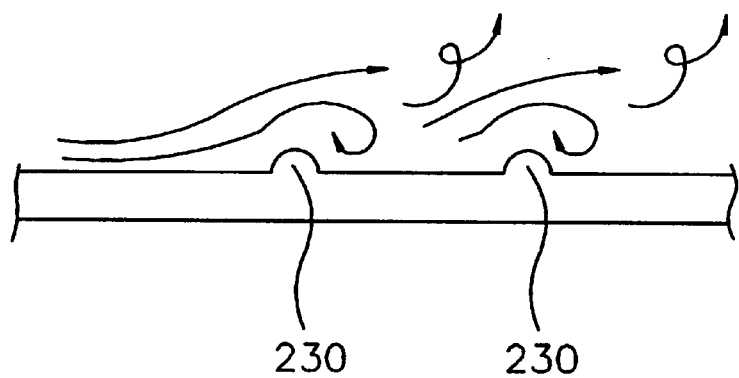
FIG. 6 is a cross-sectional view taken along line 6—6 of FIG. 5, illustrating a flow of fluid.
Figure 7:
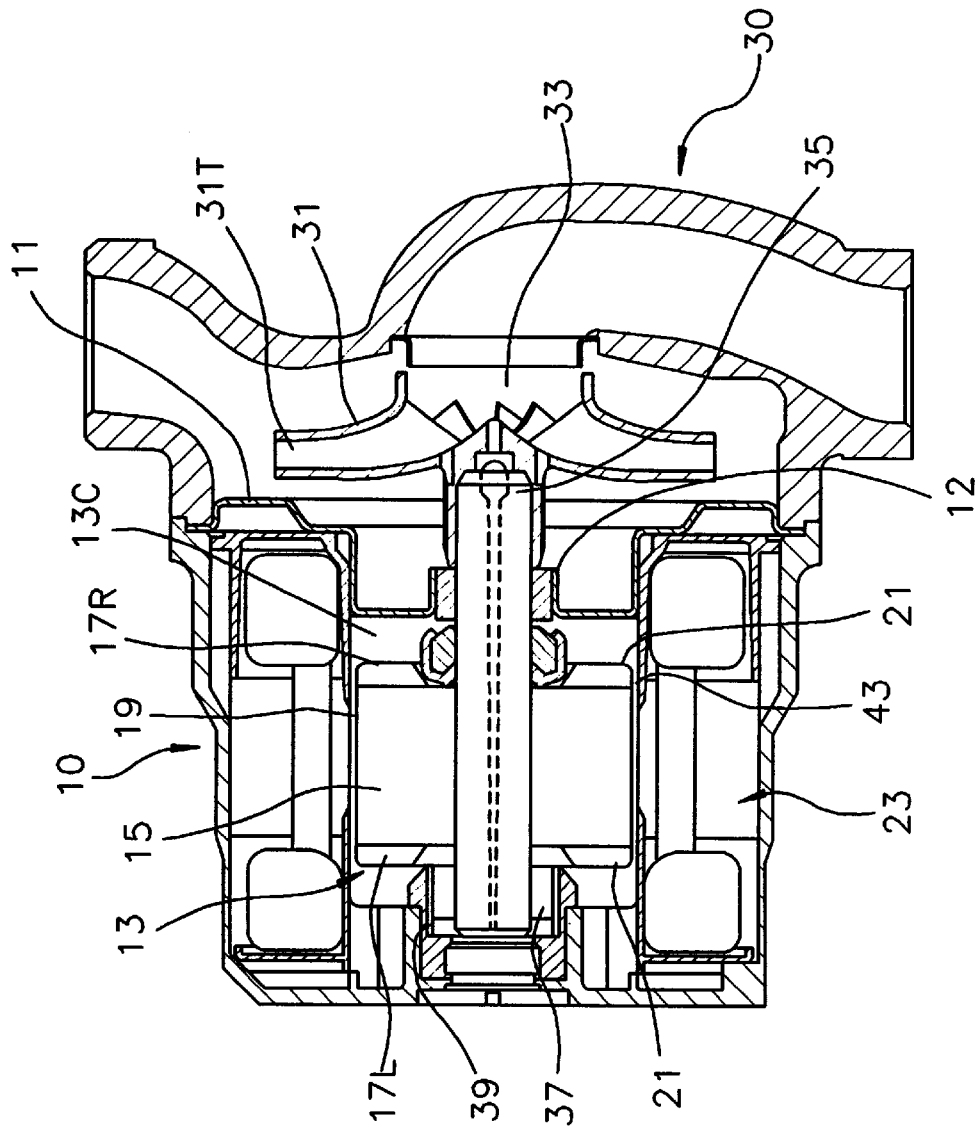
FIG. 7 is a longitudinal cross-sectional view of a canned motor pump according to a prior art.

FIG. 6 shows a fluid flow at the circumference of the protrusion 230 during the rotation of the rotor 130. Turbulent flow occurs at an area adjacent to the side surface. The turbulence phenomenon becomes increasingly severe toward the higher portion, i.e., the circumference of the protrusion 230. Further, owing to swirling flow at the rear of the protrusion 230, i.e., the downflow of the stream, the flow is separated from the surface of the rotor while being perpendicular to the radius of the rotor. Therefore, the foreign material moves away from the side surface of the rotor. That is, during the turbulent movement, since the relative heavy weight foreign material contained in the fluid has large kinetic energy, the heavy foreign material causes a larger radius of curvature. Therefore, the foreign material drifts away from the boundary layer caused by the turbulent movement, and the foreign material rises. Thus, the foreign material is away from the protrusion of rotor.

Finally, the heavy foreign material gathers at a central portion of the bottom surface of the second tube cup 190. Subsequently, the fluid in which heavy foreign material has been eliminated passes through the gap between the first tube cup 270 and the rotor 130. Thereafter, the turbulence phenomenon occurs at the circumference of the protrusion 250 of the cap 170 like that occurring around the protrusion 230 of the second tube cup 190. The fine foreign material, therefore, gathers around the rotational shaft 35. The gathered material is discharged to the central inlet 33 through the passage 40 of the rotational shaft 33.

According to the present invention as described above, since the free end of the louvered lip formed at the motor end cover extends outward from the rotational shaft of the rotor and simultaneously extends toward the impeller of the pump, the foreign material has difficulty passing through the small slit louvered opening and can not remain in the rotor chamber.

Since the raindrop shaped protrusion is configured at the bottom surface of the second tube cap and the upper surface of the protrusion is downsloped toward the rotational shaft, the heavy foreign material gathers around the rotational shaft. Therefore, the fluid free from the heavy foreign material can easily pass through the gap between the first tube cup and the rotor. The foreign material still remaining in the passing flow gathers around the rotational shaft owing to the tubulence around the protrusion of the cap, and the gathered material is discharged to the outside of the rotor chamber through the passage of the rotational shaft. Thus, the foreign material contained in the flow in the rotor chamber can be removed easily.

Furthermore, since the rotor is constituted of two components, and the downflow area of the rotor is sealedly curled, the fluid is impervious to the core of the rotor.

What is claimed:

1. A canned motor pump comprising:

a pump member having a rotatable impeller therein; and a motor separated from said pump member by a partition;

said motor comprising a rotor rotatably housed in a first tube cup, and a stator encompassing said first tube cup;

said rotor comprising wires wound on a plurality of cores stacked on a rotational shaft, one open-ended second tube cup housing said wires, and a sealable cap blocking the open end of said second tube cup;

a plurality of protrusions provided on bottom surface of said second tube cup and exterior surface of said sealable cap, radially extending toward said rotational shaft;

said protrusion being configured as a raindrop as seen perpendicularly to a cross-section of said rotational shaft.

2. The canned motor pump according to claim 1, wherein a narrow end of said protrusion is directed toward said rotational shaft.

3. The canned motor pump according to claim 2, wherein a height of said narrow end of said protrusion is lower than that of other wide end of said protrusion.

4. The canned motor pump according to claim 1, wherein said partition has a plurality of louvered lips, each free end of said louvered lip extends outward from said rotational shaft.

5. The canned motor pump according to claim 4, wherein said free end of said louvered lip is extended toward said impeller of the pump member.

* * * * *